United States Patent [19]

Milo

[11] 4,194,530
[45] Mar. 25, 1980

[54] RESTRICTIVE VENT

[75] Inventor: Joseph V. Milo, Elizabeth, N.J.

[73] Assignee: Universal Valve Co., Inc., Elizabeth, N.J.

[21] Appl. No.: 910,483

[22] Filed: May 30, 1978

Related U.S. Application Data

[63] Continuation of Ser. No. 673,991, Apr. 5, 1976, abandoned.

[51] Int. Cl.² .............................................. F16K 45/02
[52] U.S. Cl. .................................................. 137/587
[58] Field of Search ..................... 137/587, 588, 589; 285/155, 156; 220/85 VR, 86 R, 373, 374, 366, 367

[56] References Cited

U.S. PATENT DOCUMENTS

| | | | |
|---|---|---|---|
| 2,249,180 | 7/1941 | Scully et al. | 137/587 X |
| 3,391,818 | 7/1968 | Hairston | 220/373 X |
| 3,392,921 | 7/1968 | Demaison | 285/155 X |
| 3,403,809 | 10/1968 | Kennedy et al. | 220/367 |
| 3,739,937 | 6/1973 | Stock | 220/86 R |

*Primary Examiner*—William R. Cline
*Attorney, Agent, or Firm*—Weiser, Stapler & Spivak

[57] ABSTRACT

A restrictive vent suitable for use with underground flammable liquid and other storage tanks which includes an atmospheric opening considerably smaller than the inside diameter of the underground tank vent line. The restrictive vent connects in series with a combination pressure/vacuum vent to both allow the tank to breathe and also to act as a safety vent in the event that the pressure/vacuum vent device becomes inoperative.

6 Claims, 4 Drawing Figures

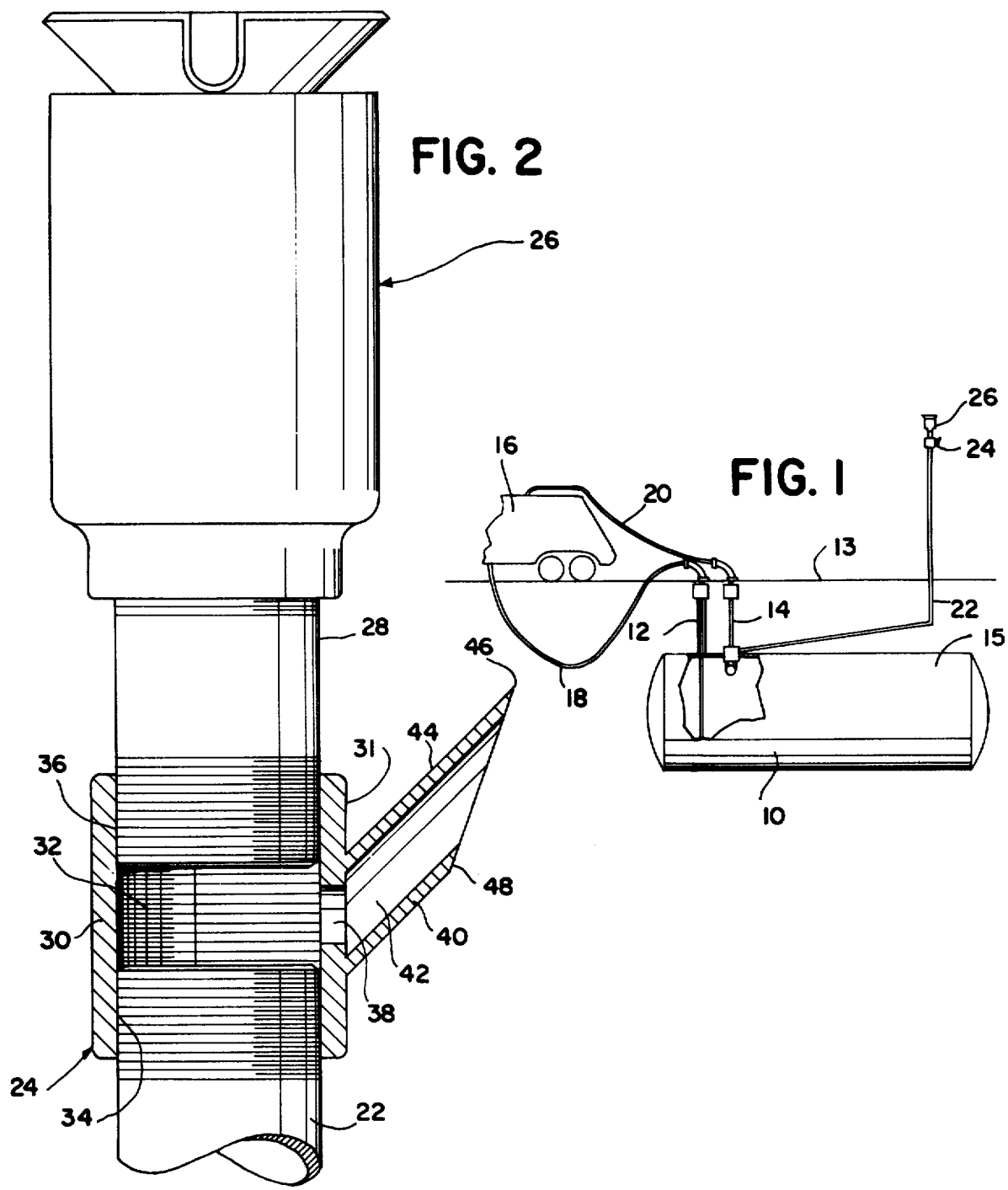

RESTRICTIVE VENT

This is a continuation of application Ser. No. 673,991 filed Apr. 5, 1976, now abandoned.

BACKGROUND OF THE INVENTION

The present invention relates generally to flammable liquid tank venting systems in general, and more particularly, is directed to a restrictive vent fitting for use with tank vapor control systems.

It is the usual practice to store flammable liquids, such as various petroleum products in storage tanks which may be either above ground or underground. In view of the fire hazard attendant with the storage of such petroleum and other hazardous products, governmental code officials, insurance underwriters and fire department officials have engaged in careful studies to establish suitable regulations to provide for the safe storage of such materials. The considerable effort and study, both in this country and abroad, with regard to suitable safety standards, has resulted in the now commonly accepted practice of storing petroleum products, such as gasoline and kerosene, in underground storage tanks of suitable size and strength for the purpose. In certain regulated instances, such as where adequate distances to populated areas can be provided, above ground storage is also permissable.

It has long been required that all petroleum products storage tanks and other flammable liquid storage tanks, either above ground or underground, be provided with suitable venting devices to equalize pressures within the tank. Most commonly, venting devices have consisted essentially of a vent pipe connected directly to the vapor section of the tank in a manner to lead flammable vapors upwardly to atmosphere at some distance above grade level. It has been found that the usual venting system as above described has generally provided adequate safety for the flammable product stored within the storage tanks and accidents directly attributable to venting have been reduced to a minimum. However, more recently, when concerned citizens became cognizant of the ecological problems arising from flammable liquid storage in relatively crowded areas, additional studies have been made of the venting systems of underground and above ground flammable liquid storage tanks. Those more recent studies were concerned primarily with the effect of the flammable vapors which were discharged into the atmosphere through the tank vents and to the environmental changes caused by the release of such vapors, rather than concern with merely the safety factors of such flammable liquid storage.

As a result of the environmental considerations, the venting systems of storage tanks are now being rapidly changed from a simple open vent to atmosphere as heretofore deemed necessary and desirable for purely safety considerations, to some type of normally closed, but openable when necessary, type of storage tank vent system, for air pollution control purposes. Traditionally, such closed and open vent systems have been installed by applying a pressure or pressure/vacuum vent fitting at the end of the tank vent line.

The pressure or pressure/vacuum vent fittings have generally proved satisfactory in reducing the discharge of flammable vapors to atmosphere. Such pressure or pressure/vacuum vent fittings normally provide either for a completely closed system under usual conditions of operation or for function of the fitting to compensate for either pressure or vacuum created within the storage tank itself. These fittings are mechanical in nature and as in any mechanical device, are subject to mechanical failure due to any one of a variety of causes. As a result of such failure, inadequate venting could result with possible dangerous consequences.

SUMMARY OF THE INVENTION

The present invention relates generally to a restrictive vent fitting, and more particularly is directed to a vent line fitting providing a normally open, restrictive safety vent to atmosphere under all conditions of use.

The present invention includes a vent fitting suitable for installation near the end of a vent line from an underground tank or above ground flammable liquid storage tank. The fitting includes a restrictive opening that is considerably smaller than the inside diameter of the vent line itself. The fitting may include a cylindrical sidewall through which a restricted size orifice is provided for venting direct to atmosphere. For example, a restrictive orifice of one-half inch diameter has been found suitable for use with a vent line of nominal two inch inside diameter. Preferably, the orifice is equipped with an upwardly directed conduit which serves to both shield the orifice from the weather and also to assure venting upwardly in an angular direction above the horizontal to properly dispense the vapors.

It is contemplated that the restrictive vent fitting can be provided either as a separate fitting for direct installation on the vent line or as a combination fitting. When utilized as a separate fitting, a separate pressure/vacuum vent fitting of conventional design should be utilized in series with the restrictive vent fitting to satisfy all present environment quality control conditions. Optionally, the restrictive vent can be built directly into a pressure/vacuum vent in the form of a restricted bypass to thereby permit a restricted percentage of the vapors within the vent line to bypass entirely the pressure/vacuum vent construction.

The unobstructed restrictive orifice normally allows the tank to breathe directly to atmosphere as a safety relief. The quantity of flammable vapors thus released directly to atmosphere will be minimal and can be controlled to comply with all known environmental quality control standards by controlling the size of the orifice. The restrictive vent serves as a safety vent by providing at least a minimum area of free atmospheric tank venting in the case of mechanical failure of the associated pressure/vacuum vent fitting.

It is therefore an object of the present invention to provide an improved restrictive vent of the type set forth.

It is another object of the present invention to provide a novel, restrictive vent incorporating an atmospheric orifice that is considerably smaller than the vent line to which it is attached.

It is another object of the present invention to provide a novel restrictive vent that is suitable for use in tank venting systems in conjunction with a pressure/vacuum vent fitting.

It is another object of the present invention to provide a novel restrictive vent including in combination atmospheric orifice means, underground tank pressure control means and underground tank vacuum control means.

It is another object of the present invention to provide a novel restrictive vent in combination with a pressure/vacuum vent fitting wherein the restrictive vent bypasses the pressure/vacuum relief mechanism of the fitting.

It is another object of the present invention to provide a novel restrictive vent including a cylindrical fitting comprising a restricted orifice provided in the sidewall thereof and exterior conduit means designed to both shield the orifice and to conduct the vapors escaping through the orifice to the atmosphere at an angle above the horizontal.

It is another object of the present invention to provide a novel restrictive vent that is rugged in construction, inexpensive in manufacture and trouble free when in use.

Other objects and a fuller understanding of the invention will be had by referring to the following description and claims of a preferred embodiment, taken in conjunction with the accompanying drawings, wherein like reference characters refer to similar parts throughout the several views and in which:

BRIEF DESCRIPTION OF THE DRAWINGS

FIG. 1 is a schematic, side elevational view of an underground flammable liquid storage tank equipped with a restrictive vent in accordance with the present invention.

FIG. 2 is an enlarged, elevational view, partly in section, showing the restrictive vent in use with a separate pressure/vacuum vent fitting.

DESCRIPTION OF THE PREFERRED EMBODIMENT OF THE INVENTION

Figure 3:
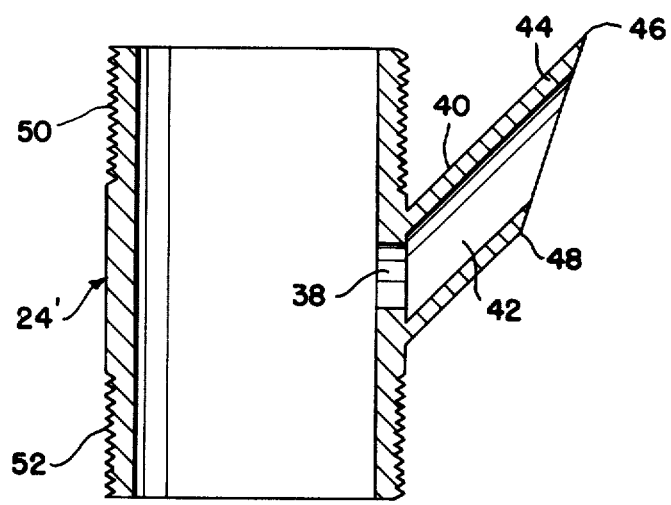
FIG. 3 is an enlarged, sectional view, showing a modified restrictive vent fitting.

Although specific terms are used in the following description for the sake of clarity, these terms are intended to refer only to the particular structure of the invention selected for illustration in the drawings, and are not intended to define or limit the scope of the invention.

Referring now to the drawings, there is shown in FIG. 1 schematically a typical underground flammable liquid storage tank installation, such as conventionally used in an automobile gasoline service station. The tank 10 is preferably fabricated in accordance with Underwriters Laboratories, Inc. standards, standards of the National Fire Protection Association and other regulations imposed by governmental authorities or interested insurance carriers with regard to size, wall thickness, openings and other considerations. The tank 10 is installed below the ground surface 13 in most installations and includes a tank fill system 12 for tank filling purposes. The tank additionally is provided with a vent 22 which communicates with the vapor space 15 at the top of the tank 10 to lead flammable vapors to atmosphere above the ground surface.

In accordance with most recent regulations issued by the Environmental Protection Agency, the tank 10 is illustrated as being equipped with a vapor return system 14 which also communicates with the vapor space 15 at the top of the tank 10. Thus, when a tank truck 16 is employed to fill the underground tank 10 with product (not illustrated), the tank truck fill hose 18 is connected conventionally to the tank fill system 12 for tank filling purposes. An additional vapor return hose 20 is employed to interconnect the vapor return system 14 of the tank with the vapor space at the top of the tank truck 16. In this manner, as product is introduced into the tank 10 by the fill hose 18, the vapor thus displaced will be drawn through the vapor return hose 20 into the vapor space of the tank truck 16 itself. In the system illustrated, the tank vent 22 is further provided with a conventional pressure/vacuum fitting 26 which is installed in accordance with Environmental Protection Agency and other environmental pollution control regulations to facilitate vapor return through the vapor return system 14 and the vapor return hose 20 back to the tank truck 16. The pressure/vacuum fitting 26 is conventional in nature and may be similar to pressure/vacuum fitting No. 46 as manufactured and distributed by Universal Valve Company of Elizabeth, N.J.

As best seen in FIG. 2, the restrictive fitting 24 comprises a generally cylindrically formed sidewall section 30 which may be similar in size to a usual pipe coupling. The sidewall section 30 is equipped with an internal threaded section 32 to threadedly engage the threaded end 34 of the vent line 22 and the threaded end 36 of the pipe nipple 28.

A restricted vent is formed in the fitting sidewall 30 by drilling or otherwise providing a restricted opening or orifice 38 of cross sectional area considerably less than the cross sectional area of the tank vent line 22. For example, if the vent line 22 is of nominal two inch diameter, the restrictive vent 38 is preferably formed to the diameter of approximately one-half inch. Thus, the ratio of the restrictive opening 38 to the vent line 22 may be stated as a relationship of diameters of approximately 1:4. The ratio of areas may be stated as follows:

$$\frac{\text{Area (Vent)} = \pi R^2 = \pi(1)^2}{\text{Area (restricted)} = \pi r^2 = \pi(\frac{1}{4})^2} = \frac{16}{1}$$

where
R = radius of the vent line
r = radius of the restrictive vent

An orifice diameter of one-quarter inch has been found too small for the use inasmuch as a one-quarter inch diameter opening will not permit a sufficient flow of vapors for tank breathing purposes or for emergency purposes. An orifice diameter of one inch or more has been found too large for free venting purposes. An orifice of one inch will permit too great a free vapor flow to atmosphere to comply with existing regulations of the Environmental Protection Agency and other regulatory bodies having jurisdiction.

A conduit 40 of generally hollow cylindrical configuration outwardly affixes to a portion of the exterior periphery 31 of the fitting sidewall 30 in conventional manner such as by welding or brazing and the conduit 40 completely surrounds the restrictive opening 38. The restrictive opening or orifice 38 communicates with the interior channel 42 defined by the conduit 40 to conduct flammable vapors (not shown) from the vapor space 15 of the tank 10 to the atmosphere. It will be noted that the conduit 40 is affixed to the fitting sidewall 30 at an angle of approximately 45° to thereby lead the flammable vapors to the atmosphere at an angle above the horizontal. It is contemplated that conduit 40 can angularly connect to the outer periphery 31 of the sidewall 30 at an angle of more than zero degrees and less than ninety degrees and optimally near forty-five degrees. As hereinbefore stated, venting through the orifice 38 must always be directed upwardly and above the horizontal to provide for adequate dispersion of the flammable vapors from the tank 10.

The conduit 40 may be fabricated of standard schedule 40 (black steel) pipe of diameter greater than one-half inch, for example, five-eighths inch diameter. Also, if so desired, the conduit 40 may be fabricated of cross sectional configurations other than round, for example, square or rectangular. In such event, the interior channel 42 defined by the conduit should be greater in cross sectional area than the cross sectional area of the restrictive opening 38 to prevent further restriction at the conduit 40. The conduit 40 terminates outwardly in an extended weather shield 44 which is designed to shield the interior channel 42 and thus the restricted opening 38 from the entrance of moisture such as rain, snow or sleet. It is contemplated that the weather shield upper end 46 will extend outwardly a distance beyond a vertical plane drawn through the lowermost end portion 48 of the conduit 40. Thus, a plane drawn through the uppermost extremity 46 of the conduit 40 and the lowermost portion 48 will define an angle that is less than ninety degrees from the horizontal.

Referring now to FIG. 3, there is illustrated a modified restrictive fitting 24' which is similar in construction and use to the restrictive fitting 24 with the exception that the internally threaded section 32 has been replaced with a pair of opposed, externally threaded ends 50, 52 for conventionally connecting to interiorly threaded fittings (not illustrated) in well known manner. Thus, depending on the other fittings employed in the tank vent line 22, either the fitting sidewall 30 can be equipped with interiorly threaded sections 32 or exteriorly threaded ends 50, 52.

Figure 4:
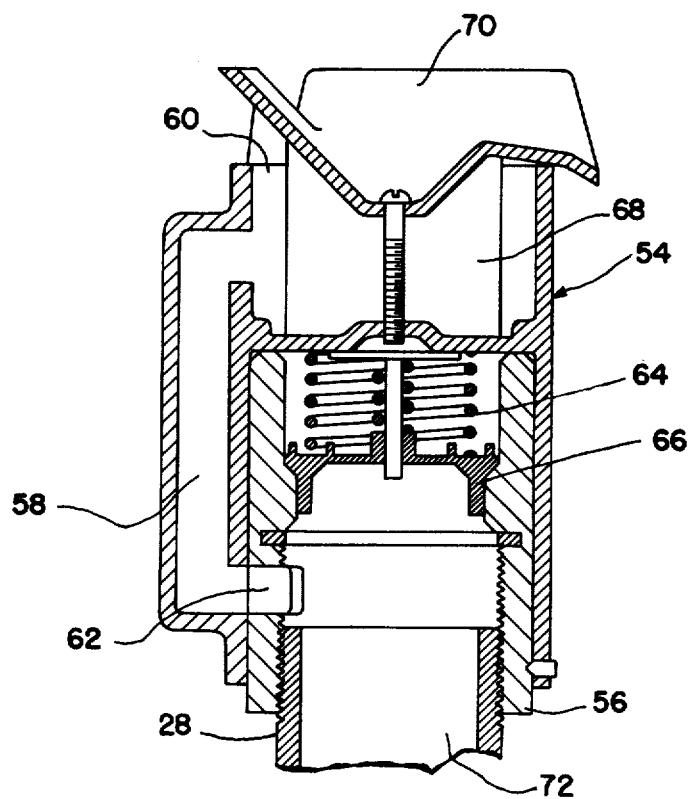
FIG. 4 is an enlarged, sectional view of a combination restrictive vent and pressure/vacuum vent fitting.

Referring now to FIG. 4, there is shown a combination pressure/vacuum fitting with integral restricted vent generally designated 54. The interior pressure/vacuum relief mechanism 66 is exactly the same as employed in Universal Valve Company fitting No. 46 which is operable by the spring 64. Function of the operating mechanism 66 permits communication of the interior of the tank vent line 22 with the atmosphere through the fitting interior conduit 68 upon certain predetermined conditions. For example, the fitting 54 can be designed to function upon any conditions of pressure or vacuum as may be specified by such agencies as the Environmental Protection Agency, for example, eight ounces of pressure or one-half ounce of vacuum. The operating mechanism 66 can also be readily adjusted to other operating conditions as specified by the agency having jurisdiction in manner well known to those skilled in the art.

The fitting 54 improves over the conventional pressure/vacuum vent fittings in providing an integral bypass 58 which is positioned exteriorly of the fitting interior conduit 68 and which exhausts to atmosphere through the top opening 60. An elongated slot/inner sleeve construction 62 communicates with the bottom terminus of the bypass 58 and the interior 72 of the tank vent line 22. As illustrated, the inner slot 62 extends interiorly of the fitting 54 and communicates with the interior space 72 to thus provide a continuous vapor path to atmosphere that is completely free of any operating mechanism such as the mechanism 66 which normally functions for providing of pressure/vacuum relief of the fitting. Preferably, the bypass 58 is restricted in size and is relatively small when compared to the free area of the vent pipe interior 72. For example, one half inch diameter bypass 58 is employed with a vent pipe line of nominal two inch size. The combined vent and bypass fitting 54 is upwardly equipped with a conventional weather cap 70 to prevent the entrance of water into the vent pipe line 22 in well known manner. The bypass 58 communicates at its exit 60 with atmosphere beneath a protecting portion of the cap 70 to thereby also prevent the entrance of rain, snow or sleet into the vent line through the bypass 58.

As illustrated, the combined restrictive vent and pressure/vacuum vent fitting 54 is provided with an internally threaded section 56 to engage the exterior threads of the threaded pipe nipple 28 in conventional manner. The nipple 28 is threadedly engaged with the threaded section 56 to form a secure, substantially leak-proof junction. It is noted that the nipple 28 is threadedly engaged with the fitting below the inner slot 62 to thereby not obstruct the entrance of vapors into the bypass section 58 from the vent interior channel 72. Of course, if so desired, the combination fitting 54 could also be provided with an exteriorly threaded section (not illustrated) to interconnect and interfit with conventional interiorly threaded fittings if such fittings are employed in constructing the tank vent line 22.

Although I have described the present invention with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. In a vent fitting for use in the vent line from a flammable liquid storage tank, which vent line defines a circular vapor path of uniform diameter to lead flammable vapors from the tank to atmosphere, the fitting comprising a hollow, cylindrical body including a sidewall section which defines a first hollow, cylindrical channel;

the sidewall section being provided with an orifice, the orifice communicating with the hollow channel, the cross sectional area of the orifice being less than the cross sectional area of the circular vapor path;

a vapor directing conduit angularly affixed to the sidewall section about the orifice, the conduit defining a second interior channel, the second interior channel communicating with the first hollow, cylindrical channel through the orifice, the conduit being affixed to the sidewall section at an angle of more than zero degrees and less than ninety degrees, the conduit terminating outwardly in an extended weather shield designed to shield the second interior channel from the entrance of rain, the weather shield comprising an upper outer end and a lower outer end, the upper end terminating outwardly further from the sidewall section than the lower outer end;

whereby at least part of the vapors within the vent line can travel to atmosphere through a path including the first cylindrical channel, the orifice and the second interior channel.

2. The vent fitting of claim 1 wherein the ratio of the cross sectional area of the orifice to the cross sectional area of the circular vapor path is approximately one to sixteen.

3. The vent fitting of claim 1 wherein the orifice is circular in configuration and wherein the diameter of the orifice is less than one inch and more than one-quarter inch.

4. The vent fitting of claim 3 wherein the diameter of the orifice is one-half inch.

5. The vent fitting of claim 1 wherein a vertical plane drawn through the upper outer end of the weather shield and the lower outer end of the weather shield defines an angle from the horizontal that is less than ninety degrees when the longitudinal axis of the hollow cylindrical body is vertical.

6. The vent fitting of claim 1 wherein the angle between the conduit and the sidewall section is forty-five degrees.

* * * * *